United States Patent [19]

Dahlqvist et al.

[11] 3,944,730

[45] Mar. 16, 1976

[54] DEVICE FOR THE ELIMINATION OF THE EFFECT OF BACKGROUND RADIATION ON THE IMAGE REPRESENTATION IN AN IR-CAMERA

[75] Inventors: Jan Dahlqvist, Akersberga; Bo Matsson, Marsta; Benny Johansson, Sollentuna, all of Sweden

[73] Assignee: AGA Aktiebolag, Lidingo, Sweden

[22] Filed: Mar. 5, 1974

[21] Appl. No.: 448,270

[30] Foreign Application Priority Data
Mar. 6, 1973 Sweden.............................. 7303077

[52] U.S. Cl. ............. 178/7.1; 178/DIG. 8; 250/334
[51] Int. Cl.² ..................... H01L 31/18; H04N 7/18
[58] Field of Search................. 178/7.1, 6.8, DIG. 8; 250/334

[56] References Cited
UNITED STATES PATENTS

| | | | |
|---|---|---|---|
| 3,751,586 | 8/1973 | Johansson...................... | 178/DIG. 8 |
| 3,798,366 | 3/1974 | Hunt.............................. | 178/DIG. 8 |

*Primary Examiner*—Howard W. Britton
*Attorney, Agent, or Firm*—Lerner, David, Littenberg & Samuel

[57] ABSTRACT

A device for the elimination of the effect of background radiation on the image representation in an IR-camera comprises scanning elements and a detector for the conversion of IR-radiation to a video signal and this video signal is supplied to an image representation unit via an a.c. voltage-coupled circuit, an image signal and a background signal appearing periodically and separate from each other in the camera.

2 Claims, 4 Drawing Figures

DEVICE FOR THE ELIMINATION OF THE EFFECT OF BACKGROUND RADIATION ON THE IMAGE REPRESENTATION IN AN IR-CAMERA

BACKGROUND OF THE INVENTION

In many IR-cameras a scanning element is arranged in front of an IR-detector, said element consisting of rotating prisms of e.g. silicon. Scanning elements are also used which contain tilting mirrors and rotating, reflecting drums. Such a scanning element causes the scanned object to be scanned in two directions.

Such scanning elements are operative so that the IR-detector, beside receiving radiation from the scanned object, also receives radiation from the camera housing and other parts included in the scanning device.

Owing to the manner of action of the scanning element only a certain portion of a sweep in the line and frame part can be used as a video signal. This part is approximately 70% of the sweep. The remaining part (30% or more) of the sweep is not pure image information but contains a signal from the scanning element itself.

A standard type of IR-camera is designed so that the detector signal is d.c. voltage-coupled to the image tube. This is often a good solution, but in certain applications, where the temperature level of the object is of no interest, it is nevertheless a disadvantage to always have to balance out manually the detector signal to zero (grey image) in order to obtain a true grey-tone image. The balancing depends upon the absolute temperature of the object concerned, and if, for example, in the first place the grey-tone image is balanced with an IR-camera directed towards a certain object for the study of the same, and subsequently the camera is directed towards another object at a somewhat different temperature level, a new balancing will have to be carried out.

To avoid this manual balancing, it is appropriate to a.c. voltage-couple the detector signal to the image tube. According to the known technique, the procedure is usually to insert a capacitor in the amplifier chain in series with the amplifier. On the output side of the capacitor the video signal mean value is then assumed to be zero, possibly with a constant voltage added from a separate adjusting element so as to adapt the d.c. voltage level of the signal to the grey level of the cathode-ray tube included in the image representation unit. As mentioned earlier, it is only a certain portion of the video signal which contains the desired information. It is not desirable that the portion of the video signal which does not contain valuable information should influence the mean-value formation in the a.c. voltage coupling in the system, since the automatic balancing would then be incorrect.

SUMMARY OF THE INVENTION

In accordance with the invention such an influence by this undesired signal is prevented by blocking the video signal during these parts of the sweep when the video signal contains undesired information.

The characteristics of the invention will be evident from the enclosed claims.

DETAILED DESCRIPTION OF THE DRAWINGS

Figure 1:
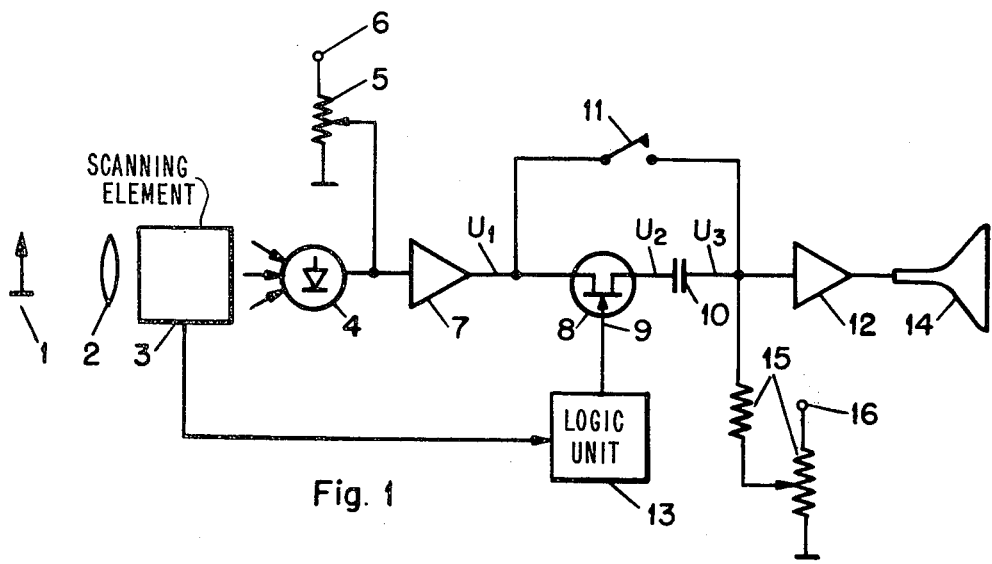

The invention will now be described in detail with the help of the enclosed drawing, which in FIG. 1 shows an example of a wiring diagram of an a.c. voltage-coupled IR-camera in accordance with the invention. FIG. 2 shows in diagrammatic form signals at different points in FIG. 1.

In the example according to FIG. 1 it is assumed that the heat radiation of an object 1 is to be examined with the help of an IR-camera. The IR-radiation of the object 1 is converted by means of an IR-detector 4 to an electric video signal. In front of this IR-detector 4 lenses 2 and a scanning element 3 are arranged. In a conventional d.c. voltage-coupled IR-camera the video signal is fed from the detector via an amplifier 7 across a switch 11 which is then assumed to be closed and a further amplifier 12 to a cathode-ray tube 14. The manual balancing mentioned above is carried out with the help of a slide rheostat 5 connected between a voltage source 6 and for example earth.

The a.c. voltage-coupling can be included in that a capacitor 10 is connected in parallel with the switch 11. The a.c. voltage-coupling is obtained when the switch 11 is opened. However, such an a.c. voltage-coupling will not function satisfactorily in accordance with what was said before, since the video signal during a large part of the sweep contains undesired information from the camera housing and different details in the scanning element.

In accordance with the invention the capacitor 10 is connected in series with a switching means 8 which breaks the video signal during the time when the video signal, as mentioned earlier, contains undesired information.

The switching means 8 is controlled from the scanning element 3 so that synchronization of the function of the switching means is obtained, which of course is possible since it is the scanning device which causes the video signal during a large part of the time to contain undesired information. This can be arranged for example so that if the scanning element consists of one or more rotating prisms, the angular position of these determines whether the video signal is to be broken or not, since it is when these prisms assume certain angular positions that undesired information will enter into the video signal.

As an example of a switching means, a field effect transistor has been indicated in the drawing. It should be pointed out, however, that other types of electrical and electromechanical breaking means can likewise be used. The control input 9 of the field effect transistor 8 is connected to a logic unit 13, which picks up the position of the scanning element 3 and depending thereupon controls the field effect transistor to close or to open the path for the video signal.

During the time the field effect transistor is blocked (the impedance in the field effect transistor is high) the signal to the video amplifier is negligible. This means that the mean value (grey tone) in the image is determined only by the part of the video signal which contains the desired image information.

On the output side of the capacitor 10 a circuit 15, 16 has been indicated on the drawing, consisting of a fixed and a variable resistor 15 and a d.c. voltage terminal 16 for the adjustment of the d.c. voltage level of the video signal, by means of which the mean value of the video signal can thus be adapted to the image representation unit.

Figure 2A:
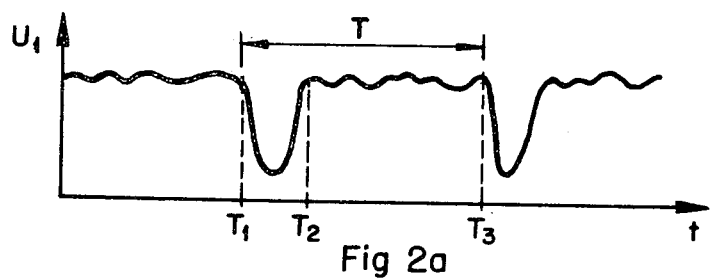
Figure 2B:
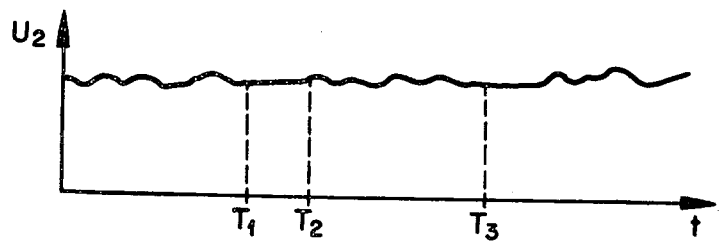
Figure 2C:
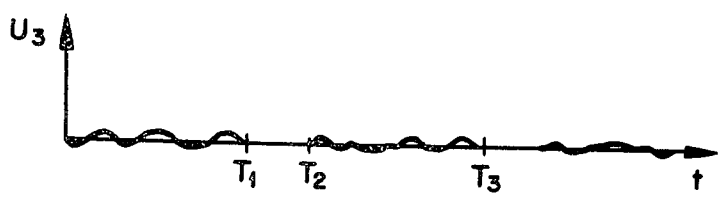

FIGS. 2a–c show the signal at three different points in the device according to FIG. 1. In FIG. 2 the horizontal axis is a time axis and the vertical axis is a voltage axis. In FIG. 1 the signals $U_1$, $U_2$ and $U_3$ are indicated at three points corresponding to FIG. 2a, 2b and 2c, respectively.

In accordance with the above the signal $U_1$ contains a video signal with on the one hand the desired information and on the other hand the undesired information. With the usually occurring scanning devices the undesired information will periodically enter into the video signal. In FIG. 2a a period of the video signal has been marked T and the part of the period which contains the undesired information is marked $T_1$–$T_2$, and the part of the video signal period which contains desired information is marked $T_2$–$T_3$.

The mean value $U_{m1}$ of the signal $U_1$ during a period T according to FIG. 2a is $$U_{m1} = \frac{1}{T_2-T_1} \int_{T_1}^{T_2} U_1(t)\,dt + \frac{1}{T_3-T_2} \int_{T_2}^{T_3} U_1(t)\,dt$$

During the period $T_1$–$T_2$ no new information (signal) is supplied to the capacitor 10 because the switching means 8 is open and blocks the signal. The voltage over the capacitor 10 will be the same during the time $T_1$–$T_2$ as it was at time $T_1$. This is shown in FIG. 2b.

The mean value $U_{m2}$ of the signal $U_2$ in FIG. 2b can be written:

$$U_{m2} = U_1(T_1) + \frac{1}{T_3-T_2} \int_{T_2}^{T_3} U_1(t)\,dt$$

The signal $U_2$ is the signal appearing at a point between the breaking means 8 and the capacitor 10.

The signal $U_3$ on the opposite side of the capacitor 10 will consist of the a.c. voltage part of signal $U_2$, since the capacitor 10 does not transmit the d.c. voltage.

The a.c. voltage signal will exist only during the period $T_2$–$T_3$ and the signal $U_3$ will therefore have the appearance according to FIG. 2c.

This means that the mean value in the image, which is shown by the cathode-ray tube 14, will be determined only by the a.c. voltage part of the video signal containing the desired image information (FIG. 2c).

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

What is claimed is:

1. A device for the elimination of the effect of background radiation on the image representation in an IR-camera, which comprises scanning elements and a detector for the conversion of IR-radiation to a video signal, a-c coupling means for coupling said video signal to an image representation unit, said video signal including an image signal and a background signal appearing periodically and separate from each other on said detector, switching means in the path of the video signal between said detector and said a-c coupling means therefor, said switching means being operative to open and close the signal path for the video signal periodically under control from said scanning element, whereby only the part of the video signal which contains said image signal is passed to said image representation unit.

2. A device in accordance with claim 1, wherein said switching means includes a field effect transistor, said field effect transistor having a control input connected to a logic unit operative to pick up the position of the scanning element to thereby control said field effect transistor to close or open the path for the video signal.

* * * * *